No. 734,750. PATENTED JULY 28, 1903.
W. M. RHEEM.
FEEDER MECHANISM FOR PRESSES.
APPLICATION FILED DEC. 26, 1900.
NO MODEL. 2 SHEETS—SHEET 2.
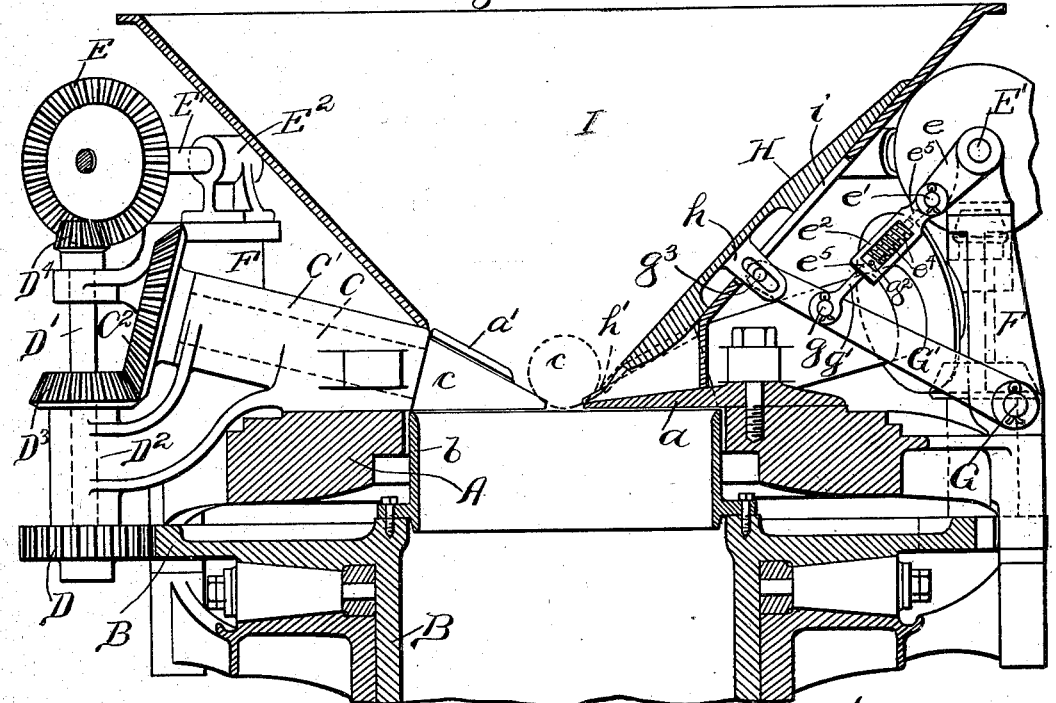
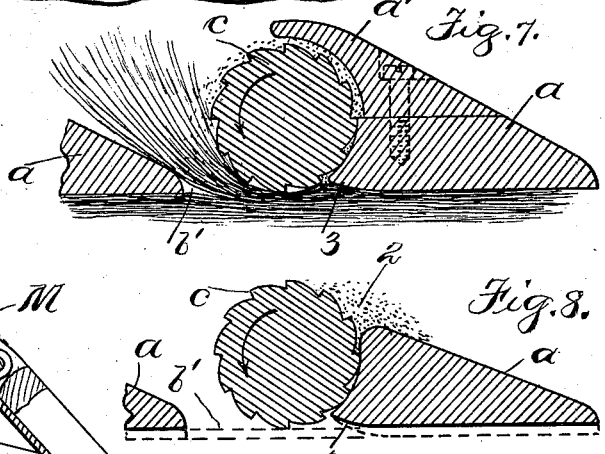
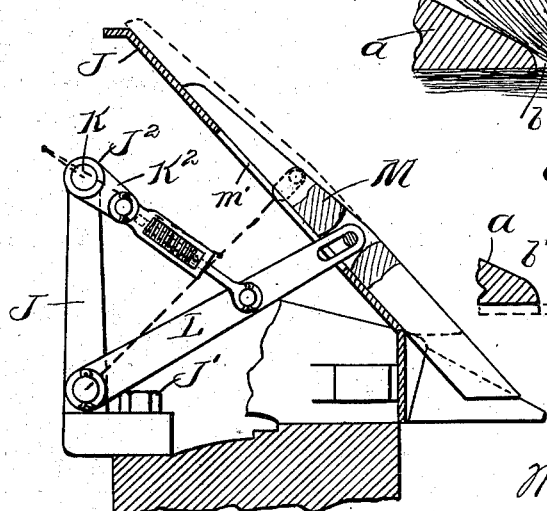

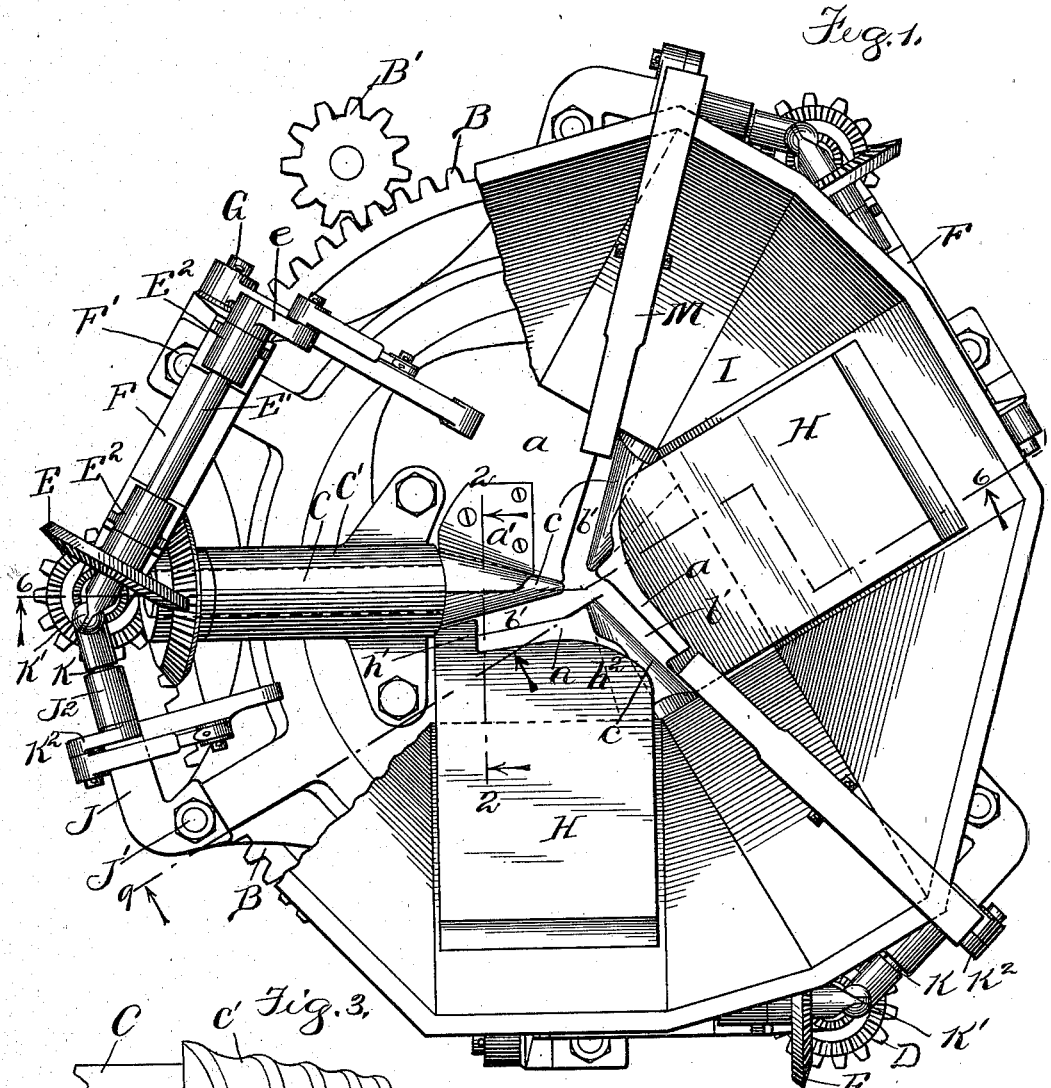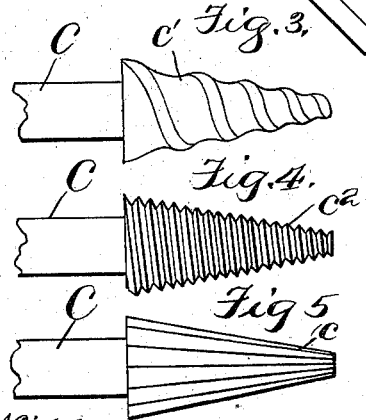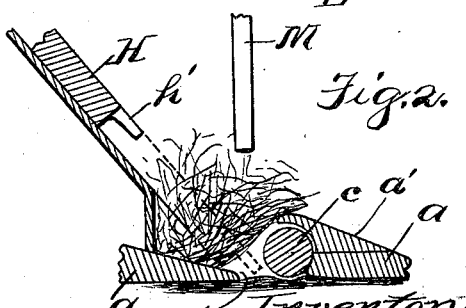

No. 734,750. Patented July 28, 1903.

UNITED STATES PATENT OFFICE.

WILLIAM M. RHEEM, OF BOSTON, MASSACHUSETTS, ASSIGNOR, BY MESNE ASSIGNMENTS, TO PLANTERS COMPRESS COMPANY, A CORPORATION OF MAINE.

FEEDER MECHANISM FOR PRESSES.

SPECIFICATION forming part of Letters Patent No. 734,750, dated July 28, 1903.

Application filed December 26, 1900. Serial No. 41,130. (No model.)

*To all whom it may concern:*

Be it known that I, WILLIAM M. RHEEM, a citizen of the United States, residing at Boston, in the county of Suffolk and State of Massachusetts, have invented a new and useful Feeder Mechanism for Presses, of which the following is a specification.

This invention relates to feeder mechanism for presses.

The object of the invention is to provide a feeder mechanism for presses which is simple in construction and efficient in operation, whereby the feed of the material to the compressing apparatus is facilitated.

A further object of the invention is to provide a feeder mechanism for material which has no definite fiber structure, and whereby such material is efficiently presented to the compressing apparatus.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a plan view of a construction embodying my invention, portions of the hopper being broken away and other parts of the apparatus removed. Fig. 2 is a broken detail view in section on the line 2 2, Fig. 1, looking in the direction of the arrows. Figs. 3, 4, and 5 are broken detail views showing various forms of feeder-rolls embodying the principles of my invention. Fig. 6 is a view in section on the line 6 6, Fig. 1, looking in the direction of the arrows. Fig. 7 is a broken detail view in section transverse of a feeder-roll, showing the arrangement thereof with respect to the head-plate and the shield for the feeder-roll. Fig. 8 is a view similar to Fig. 7, but without the feeder-roll shield. Fig. 9 is a broken detail view in section on the line 9 9, Fig. 1, looking in the direction of the arrows.

The same part is designated by the same reference-sign wherever it occurs throughout the several views.

In patents heretofore granted to George A. Lowry—notably, Patent No. 630,369, dated August 8, 1899—is set forth a type of compressing apparatus in which is employed a slotted head-plate through the slots in which fiber or other material is drawn in the form of flattened highly-compressed thin sheets or layers, which layers are superposed upon each other, thereby building up endwise a compressed column of high density, the cap-plate forming an abutment against which one end of the compressed column abuts, the head-plate and column being mounted for relative movement. In the operation of a compressing apparatus embodying these generic characteristics the material to be compressed is supplied to the head-plate in proximity to the slots or openings therethrough and such material is grasped between the bounding lip or surface of the slot or slots and the surface of the material previously compressed and introduced through the slot or slots and is drawn through the slot or slots in the form of a flattened highly-compressed sheet or layer which by reason of the relative movement of the head-plate and the compressed material previously introduced through the slot is laid upon the surface of such previously introduced and compressed material, the fibers of the material thus drawn through the slots by reason of becoming entangled or engaged with the fibers of the additional material supplied to the vicinity of the slot effecting a drawing action thereon and the consequent feeding of the same through the slot. In certain classes of material—such as shredded-corn stover, short-chopped hay, paper scraps or strips, or refuse from printing establishments and paper-mills, and similar material—there is no definite fiber structure as between the different particles of the material which would be likely to become entangled or engaged with the fiber of adjacent pieces, so as to be drawn through the slot in the head-plate of the character referred to to be compressed and baled. This is especially true where such material is quite dry. In such cases and with such class of material the feeding action of the compressing apparatus is impaired because of the lack of tendency of the fibers of the material to cling together, as in the case of cotton, hay, wool, or the like. The apparatus hereinafter described, while adapted for use in feeding any class or character of material to the compressing apparatus of the type disclosed in the patent to Lowry, above mentioned, is particularly designed for use in efficiently feeding or presenting material which has no definite fiber structure—such as shredded-corn stover, short chopped-up hay, paper scraps or strips, and the like—and wherein the material itself has little tendency to draw additional material with it through the slots or openings in the head-plate.

Referring to the accompanying drawings, reference-sign A designates the head-plate ring; $a$, the head-plate, having the feed slots or openings $b'$ therethrough, through which the material is passed. Any desired construction and arrangement may be provided for securing relative movement of the head-plate and the compressed column of material. In the form shown the head-plate and its supporting-ring are stationarily mounted, and rotation relative thereto of the compressed column is effected through the gear-sleeve B, having gear-teeth formed on or carried by the flange thereof, as clearly shown in Fig. 1, adapted to be engaged and driven by a pinion $B'$ from any suitable or convenient source of power. If desired, a compression-sleeve $b$ may be employed; but this is not absolutely necessary and may be omitted, if desired. The parts so far described may be substantially the same as set forth, described, and claimed in the prior patents to Lowry, a notable instance of which is above referred to.

In carrying out my invention I arrange a feeder-roll $c$ adjacent to the compressing edge or lip of the slot $b'$ and so arranged that the peripheral surface thereof is in parallel relation to the plane of the under surface of the head-plate. In practice I prefer to employ conical rolls, as shown, the end of smallest diameter being presented to the center of the head-plate, said rolls extending in radial relation with respect to such center. The feeder-rolls may be positively driven in many different ways. I have shown a simple arrangement of driving mechanism therefor wherein each roll is carried upon a shaft C, journaled in a casting or bracket $C'$, mounted or supported upon the head-plate ring A or other convenient fixed part of the framework, and so relatively inclined to the plane of relative movement of the head-plate and compressed mass of material as to present the under peripheral surface thereof in substantially parallel relation with respect to the end surface of the compressed mass of material, as clearly shown in the drawings. The bracket or casting $C'$ is provided with a bearing $D^2$, in which is journaled a shaft $D'$, having mounted thereon a pinion D and a gear $D^3$. The pinion D is arranged to intermesh with and to be driven from the gear-sleeve B, and the gear $D^3$ is arranged to intermesh with and to drive a gear $C^2$, carried by shaft C. Thus when the gear-sleeve B of the compressing apparatus is driven rotation is imparted to the feeder-roll. It is understood that each feeder-roll employed may be similarly driven. In practice if the edge of the slot or opening in the head-plate which lies adjacent to the peripheral surface of the roller were abrupt the material would tend to choke in the space between the adjacent surfaces of the roller and the lip of the head-plate; but by beveling, inclining, or rounding the adjacent edge of the lip of the slot in the head-plate, as indicated at 3, Figs. 7 and 8, the choking of the material by the same bulging up into the space between the adjacent surfaces of the feeder-roll and the edge or surface of the lip or slot in the head-plate is prevented. The slight lead thus given to the compressing edge of the lip of the slot away from the adjacent surface of the feeder-roll by slightly beveling, inclining, or rounding said compressing edge or lip, as above stated, not only prevents choking of the material, but also will impart a directive movement or trend of the material away from the roller and in a direction to be carried under the lip, thus also operating to strip the material from the surface of the roller. I also prefer to so journal and arrange the feeder-roll that the line of the lower peripheral surface thereof which is in substantially parallel relation with respect to the under surface of the head-plate and the underlying surface of the compressed material will be slighly above the inner surface of the head-plate, as clearly indicated in dotted lines in Fig. 8. By this arrangement in some classes of material the entire compression of the material as it enters or is drawn through the slot or opening in the head-plate is not effected by the roll, but is only partially effected by such roll, the compressing effect being completed by the surface or portion 3 of the adjacent lip, as clearly indicated in Fig. 2 and by the lower dotted lines in Fig. 8. By this arrangement the strain on the shaft and bearing of the feeder-roll is very much relieved. Fig. 7 and the full lines of Fig. 8 show the relation in which the parts may be arranged when this roller is not thus raised.

It has been found in practice that by the use of conical rollers in conjunction with the slotted head or cap plate, the rollers being arranged to form lips for the slots in the head-plate and being positively driven, material such as shredded-corn stover, short hay and grass, clover, or the like can be more efficiently baled. The feeder-rolls may be provided with a smooth surface, as shown in Fig. 2. It has been found, however, that an improved feeding effect is secured with certain classes of material—such, for instance, as shredded-corn stover and the like—by scoring, grooving, or corrugating the feeder-rolls.

In Fig. 3 I have shown a form of feeder-roll $c'$, provided with a spirally-arranged rib or groove. In Fig. 4 is shown a feeder-roll $c^2$, which is threaded like the thread of a machine-screw. In Figs. 5, 7, and 8 is shown rolls having longitudinal corrugations. In the forms shown in Figs. 3 and 4 the threads or spirals may be either right or left handed with respect to the direction of rotation of the roll, or they may not be complete threads, but merely transverse grooves around the roll. By providing the rolls with threads or spiral grooves the direction or trend of feed of the material through the slot in the head-plate may be directed toward the inner end or the outer end of the slot in the head-plate, according as the threads are right or left handed, and by varying the threads, scores, or grooves the trend of the feeding action may be varied, thereby securing to some extent an evenness of feed throughout the length of the slot.

With certain kinds of material, especially material which is dry and brittle, such as shredded-corn stover, the feeder-rolls develop a tendency to granulate the material to some extent, and this is particularly true where the rolls are corrugated. This granulated material will be carried by the roll and will finally lodge on top of the head-plate, as shown at 2, Fig. 8. This granulated material possesses no fiber formation, and hence will not feed into the press of itself and will not cling to the additional material and be drawn in therewith, but will accumulate back of the roll and eventually will choke up the slots. It is difficult to form a close joint between the rear of the feeder-roll and the cap-plate, and hence the greater space between the adjacent surfaces of the feeder-roll and the lip of the slot the greater will be this objection of accumulation of granulated material on top of the head-plate. It is desirable to avoid the objection noted, and to obviate the difficulty I place a shield or guard $a'$ upon the head-plate adjacent to the roll and arrange the same to overhang or overlie the roll, the inner surface of the guard following the contour of the roll, as clearly shown in Figs. 2 and 7. By the provision of this guard or shield it will be seen by reference to Fig. 7 that any broken up or granulated portions of the material which may tend to pass up back of the roll and between the roll and the adjacent surface of the lip of the slot will be directed by the shield over the top of the roll, thereby permitting such granulations or particles to be again commingled or mixed in small portions with the incoming material as it enters the slot, and hence be carried therethrough together with the additional material. A guard or shield $a'$ is also advantageous even where the feeder-rolls are not scored, grooved, or corrugated, because any material adapted to be compressed in a machine of this character has more or less tendency to work out between the roll and the head-plate, whereas if such material is conducted back to the slot again and allowed to commingle with the new incoming material entering the slot it will be more efficiently fed into the compressing apparatus.

In the use of feeder-rolls such as above described, and particularly where the feeder-rolls are of considerable diameter toward the outer ends thereof, it sometimes occurs that fresh material delivered to the head-plate will rest partly on the surface of the head-plate and partly across the feed-roll or upon the shield $a'$, or otherwise, thereby forming a bridge over or across the slot through the head-plate, and hence interrupting or impairing the efficient feed of the material through the slot, as clearly indicated in Fig. 2. This bridging of the material across the slot in the head-plate may be broken down or disturbed in many different ways. I have shown a simple and convenient arrangement of devices for accomplishing this result, wherein I employ one or more pushers H M in connection with each slot in the head-plate, the function of which is to intermittently break down any bridge the material may form across the slot in the head-plate and to force such material into close proximity to such feed-slot and to the surface of the relatively moving compressed mass, which, as clearly shown in Fig. 2, bulges or expands somewhat into the slot. The pushers H comprise blocks arranged on the inner surface of the feed-hopper I and are inclined in the direction in which the material is drawn through the slot in the head-plate. At its lower end the pusher H is provided with a finger $h'$ at the outer edge thereof, the purpose of which is to force the material under the feeder-roll near the outer end thereof to enable the material to be more efficiently drawn through the slot at that point. The other lower corner or edge $h^2$ of the pusher is arranged to operate over the top surface of the next adjacent feeder-roll in connection with which such pusher is used for the purpose of scraping or pushing off any material which may have become lodged on top of the feeder-roll and the head-plate. The pushers H may be operated or moved in many different ways and by many specifically-different arrangements of operating mechanism. It is desirable, however, to impart a yielding movement or reciprocation to said pushers in order to avoid danger of breaking the driving mechanism or of any of the parts in case any hard or foreign substance or too large a batch of material should become interposed between the feeding edge or end of the pusher and the head-plate. To secure these results and to provide a simple and efficient actuating mechanism for these pushers, I provide said pushers with slotted ears $h$, arranged to project through slots $i$ in the hopper, the slots in such ears arranged to receive a pin $g^3$, carried in the end of a lever G', pivotally mounted upon a pin or stud G, carried in a bracket F, supported or bolted, as at F', upon a fixed part of the machine-frame. The slots in the ears $h$ are elongated in order to provide a desirable range of relative movement of the pin $g^3$ therein. In suitable bearings $E^2$, formed on or carried by bracket F, is journaled a shaft E', upon which is mounted a gear E, arranged to intermesh with and to be driven by a gear $D^4$, carried by shaft E'. Upon shaft E' is mounted a crank-arm $e$, said crank being yieldingly connected to arm G'. By this construction it will be seen that when shaft E' is rotated a reciprocatory movement is imparted to feeder H. The yielding connection between crank $e$ and arm G' may be effected in many different ways. I have shown as illustrative of the principles involved a simple and convenient construction and arrangement wherein I pivot a rod $g'$, as at $g$, upon arm G' and arrange said rod to be slidably received in bearings $e^5$, formed in a link or casting $e^2$, said link or casting being pivotally connected, as at $e'$, to the crank $e$. Upon rod $g'$ is arranged a collar $g^2$. A spring $e^4$ is mounted upon rod $g'$ and is interposed between collar $g^2$ and link or casting $e^2$. Thus reciprocations are imparted to the pusher H through a yielding driving mechanism, thereby avoiding danger of breakage of the parts.

The construction and arrangement of driving mechanism for the pushers M may be a duplicate of that above described for the pushers H. In Fig. 9 I have shown said pushers M as pivotally connected to one end of a pivoted arm L, said arm operating through a slot $m'$ in the hopper I, said arm L being connected yieldingly to the crank-arm $K^2$ of a shaft K, journaled in bearings $J^2$, formed on a bracket J, bolted or otherwise secured, as at J', to a fixed part of the framework in the same manner as above described with respect to the actuating means for pusher H. The shaft $K^2$ is connected by a universal joint K' to shaft E'. The yielding connection between arm L and crank $K^2$ may be identical with that above described with reference to the yielding connection between arm G' and crank $e$, and therefore need not be again specifically described. The pushers M are arranged to operate in substantially parallel relation with respect to the axes of the feeder-rolls, but inclined with respect to the plane of the head-plate, while the pushers H are arranged to operate in a plane inclined with respect to the plane in which pusher M operates, as most clearly shown in Fig. 2. As shown in said Fig. 2, the pushers H and M occupy the relative positions thereof when about midway their respective strokes. In practice I so arrange the operating mechanism for the pushers H M that when one of these pushers is projected to the lowermost limit of its stroke the other pusher is withdrawn to the uppermost limit of its stroke, and hence said pushers act alternately, and in operation they are designed to break down any bridging of the material, such as is indicated in Fig. 2, and to also direct the material close down into the slot in order to give the lip, which is formed by the roll and the underlying compressed material, an opportunity to grasp the loose new material and draw it through the slot, the projections $h'$ at the outer corners of the pushers H serving to tuck the material under the roll toward the outer edge of the bale. This is a desirable feature, for the reason that the top surface of the roll is so far above the top surface of the compressed material that without such a device it is difficult to secure a proper feed of the material toward the outer periphery of the compressed mass.

It is obvious that the pushers above described may operate and perform their functions without the employment of feed-rolls. It is also obvious that one or the other of the pushers H M for each slot may be omitted without departure from the scope of my invention.

While I have shown a feeding apparatus employing only three feed-slots and feeder-rolls, it is obvious that any number of such slots and rolls may be employed.

While I have shown my invention as applied to a type of compressing apparatus wherein the head-plate is held stationary, I desire it to be understood that my construction and arrangement are equally well adapted for use in connection with a machine in which the head-plate rotates and the compressed mass of material is held stationary. In such case the gear-sleeve B will be held stationary, while the head-plate ring A will be revolved, thereby securing the same action of the feeding devices as above described.

It is obvious that many other variations and changes in the details of construction and arrangement would readily suggest themselves to persons skilled in the art and still fall within the spirit and scope of my invention. I do not desire, therefore, to be limited or restricted to the exact details shown and described; but, Having now set forth the object and nature of my invention and a construction embodying the principles thereof and having set forth the construction, purpose, and function thereof, what I claim as new and useful and of my own invention, and desire to secure by Letters Patent of the United States, is—

1. In a press, a slotted head-plate, the edge of the slot in said head-plate forming a compressing-lip for the material, in combination with a feeder-roll arranged adjacent to said compressing-lip, said feeder-roll being scored, grooved or corrugated, whereby the material is given a directive feed with reference to the length of the slot, as and for the purpose set forth.

2. In a press, a slotted head-plate, the edge of the slot in said head-plate arranged to effect the compression of the material, in combination with a feeder-roll journaled adjacent to said compressing-lip, said feeder-roll being scored, grooved or corrugated, whereby the material is given a directive feed with reference to the length of the slot in the head-plate, and means for positively driving said roll, as and for the purpose set forth.

3. In a press, a head-plate having a feed-slot therethrough, in combination with a feeder-roll arranged to extend into the slot in said head-plate and to a point slightly above the inner surface of said head-plate, as and for the purpose set forth.

4. In a press, a head-plate provided with a feed slot or opening therethrough, in combination with a feeder-roll, having the peripheral surface thereof adjacent to the compressing edge or lip of said slot or opening, said feeder-roll extending to a point slightly above the inner surface of the head-plate, and means for driving said feeder-roll, as and for the purpose set forth.

5. In a press, a head-plate provided with a feed slot or opening therethrough, in combination with a conical roller arranged with the lower surface thereof in parallel relation with respect to said slot or opening, and to project into such slot or opening to a point slightly above the inner surface of the head-plate, as and for the purpose set forth.

6. In a press, a head-plate provided with a slot or opening therethrough, in combination with a feeder-roll arranged adjacent to such slot or opening, and provided with spiral ribs or grooves, and means for driving said roll, as and for the purpose set forth.

7. In a press, a head-plate having a slot or opening therethrough, a feeder-roll arranged in said slot or opening, and a shield for said roll, said shield being arranged to extend partially around and over said roll, as and for the purpose set forth.

8. In a press, a head-plate having a feed slot or opening therethrough, a feeder-roll arranged adjacent to the compressing-lip of said slot or opening, and a shield arranged to extend over and partially around said roll, as and for the purpose set forth.

9. In a press, a head-plate having a feed slot or opening therethrough, a feeder-roll arranged adjacent to the compressing-lip of said slot, and a shield carried by said head-plate and arranged to extend over and partially around the upper surface of said roll, as and for the purpose set forth.

10. In a press, a head-plate having one or more feed slots or openings therethrough, in combination with a pusher arranged to operate in a plane inclined with respect to the plane of the head-plate and to press or crowd the material toward and in proximity to the feed slot or opening in said head-plate, and means for yieldingly actuating said pusher, as and for the purpose set forth.

11. In a press, a head-plate having one or more feed slots or openings therethrough, in combination with a hopper, a pusher arranged to operate therein in a plane inclined with respect to the plane of the head-plate, an operating-shaft for said pusher, means for driving said shaft, and yielding connections between said shaft and pusher, as and for the purpose set forth.

12. In a press, a head-plate having one or more feed slots or openings therethrough, in combination with a hopper, a pusher, a pivotally-mounted arm, said arm being pivotally connected to said pusher, a drive-shaft, means for operating the same, and a yielding connection between said shaft and arm, as and for the purpose set forth.

13. In a press, a head-plate having one or more feed slots or openings therethrough, in combination with a hopper, a pusher arranged to operate therein, an arm pivotally connected to said pusher, a drive-shaft having a crank-arm, a rod connected to said first-mentioned arm, a link connected to said crank-arm, and a spring interposed between said link and rod, as and for the purpose set forth.

14. In a press, a head-plate having a plurality of feed slots or openings therethrough, in combination with a pusher, and means for actuating the same, the pushing edge of said pusher operating in connection with two adjacent slots in the head-plate, as and for the purpose set forth.

15. In a press, a head-plate having a feed slot or opening therethrough, in combination with a pair of pushers, said pushers operating in planes inclined with respect to each other and to the plane of the head-plate to crowd the material to be compressed toward said slot or opening, as and for the purpose set forth.

16. In a press, a head-plate having a feed slot or opening therethrough, a feeder-roll arranged adjacent to the compressing-lip of said slot or opening, in combination with a pusher provided with a finger arranged to crowd the material down under said roll, as and for the purpose set forth.

17. In a press, a head-plate having a feed slot or opening therethrough, in combination with a conical roller arranged parallel with respect to, and operating within, said slot, and a pusher provided with a finger at its outer corner, and means for actuating said pusher, as and for the purpose set forth.

18. In a press, a head-plate having feed slots or openings therethrough, a feeder-roll associated with each slot or opening, in combination with a pusher arranged to coöperate with two adjacent feeder-rolls, as and for the purpose set forth.

19. In a press, a head-plate having a feed-slot therethrough, in combination with a feeder-roll, the lip of the slot in the head-plate which is contiguous to the surface of the roll being provided with a lead with reference to the surface of the feeder-roll, as and for the purpose set forth.

20. In a press, the combination with a slotted head-plate, and a feeder-roll arranged to operate within the slot in said head-plate, and in proximity to the compressing edge or lip of the slot in the head-plate, said compressing edge or lip being formed to impart a directive movement or trend to the material from such roll into the press, as and for the purpose set forth.

21. In a press, a head-plate having a feed-slot therethrough, in combination with a feeder-roll operating within said slot and in close proximity to one edge of said slot, said edge being beveled, inclined, or rounded, as and for the purpose set forth.

22. In a press, a head-plate having a feed-slot therethrough, the edge of said slot being beveled or rounded on the under surface thereof, in combination with a feeder-roll arranged adjacent to said edge and operating in said slot, as and for the purpose set forth.

23. In a press, a head-plate having a feed-slot therethrough, one of the edges of said slot being beveled, inclined or rounded, in combination with a feeder-roll arranged to extend into the slot and to a point slightly above the inner surface of said head-plate, as and for the purpose set forth.

24. In a press, a head-plate having a feed-slot therethrough, the compressing edge of said slot being beveled, inclined or rounded, in combination with a feeder-roll arranged to extend into the slot and to a point slightly above the inner surface of said head-plate, as and for the purpose set forth.

25. In a press, a head-plate having one or more feed slots or openings therethrough, a feed-roller arranged adjacent to the compressing-lip of said slot or opening, in combination with a pusher arranged to operate in a plane inclined to the plane of the head-plate and approximately in the direction of the material entering under the roller to move material toward said opening, and means for actuating said pusher, as and for the purpose set forth.

26. In a press, a head-plate having one or more feed slots or openings therethrough, in combination with a hopper having sides inclined toward said openings, and adapted to move toward and from said openings in the direction of said inclination, and means to actuate said sides, as and for the purpose set forth.

27. In a press, in combination with a head-plate having one or more feed slots or openings therethrough, a hopper having one or more sides set obliquely to the plane of the head-plate, said sides having sections adapted to reciprocate toward and from said openings, and means to actuate said reciprocating sections, as and for the purpose set forth.

28. In a press, in combination with a head-plate having one or more feed slots or openings through it, a hopper having sides, one side adjacent to each such slot or opening, sloping thereto and arranged approximately parallel to the longer dimension thereof, as and for the purpose set forth.

29. In a press, in combination with a head-plate having one or more feed slots or openings through it, a hopper having sides, one side adjacent to each such slot or opening, sloping thereto and arranged approximately parallel to the longer dimension thereof, movable sections on said sides, and means to give said sections a reciprocating motion toward and from said slots or openings, as and for the purpose set forth.

30. In a press, a head-plate having a feed slot or opening therethrough, a feeder-roll arranged adjacent to the compressing-lip of said slot or opening, in combination with a pusher provided at its lower edge with a finger projecting forward and adapted to project partly under said roll, and means to actuate the pusher, as and for the purpose set forth.

In witness whereof I have hereunto set my hand, this 17th day of December, A. D. 1900, in the presence of the subscribing witnesses.

WILLIAM M. RHEEM.

Witnesses:
R. G. BLANC,
LOUISE CORNELL.